(12) United States Patent
Steinke

(10) Patent No.: US 7,803,453 B2
(45) Date of Patent: Sep. 28, 2010

(54) LAMINATED STRUCTURE AND METHOD FOR PRODUCING A LAMINATED STRUCTURE

(75) Inventor: Uwe Steinke, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 11/749,935

(22) Filed: May 17, 2007

(65) Prior Publication Data

US 2007/0267140 A1    Nov. 22, 2007

Related U.S. Application Data

(60) Provisional application No. 60/747,456, filed on May 17, 2006.

(30) Foreign Application Priority Data

May 17, 2006    (DE) .................. 10 2006 023 210

(51) Int. Cl.
*B32B 27/00*    (2006.01)
(52) U.S. Cl. .................. 428/212; 428/332; 428/411.1
(58) Field of Classification Search .................. 428/212, 428/332, 411.1, 307.1
See application file for complete search history.

(56) References Cited

U.S. PATENT DOCUMENTS

| | | | | |
|---|---|---|---|---|
| 3,779,720 A * | 12/1973 | Ellis et al. | .................. | 428/564 |
| 4,029,838 A | 6/1977 | Chamis et al. | | |
| 4,609,004 A * | 9/1986 | Greene et al. | .................. | 137/38 |
| 5,360,129 A * | 11/1994 | Lee | .................. | 220/1.5 |
| 6,114,050 A * | 9/2000 | Westre et al. | .................. | 428/608 |
| 7,211,338 B2 * | 5/2007 | Strangman | .................. | 428/698 |
| 7,300,708 B2 * | 11/2007 | Gigliotti et al. | .................. | 428/632 |

FOREIGN PATENT DOCUMENTS

| | | |
|---|---|---|
| DE | 2819076 A1 | 10/1979 |
| DE | 69314175 T2 | 3/1998 |
| DE | 69823798 T2 | 4/2005 |
| DE | 10360808 A1 | 7/2005 |
| EP | 0056289 B1 | 12/1985 |
| WO | 03/068494 A1 | 8/2003 |

* cited by examiner

*Primary Examiner*—David R Sample
*Assistant Examiner*—Lawrence D Ferguson
(74) *Attorney, Agent, or Firm*—Fowler White Boggs P.A.; Christopher Paradies

(57) ABSTRACT

A method for producing a laminated structure, where the method comprises the forming of a primary laminated structure from a plurality of layers; and the forming of an additional layer, the additional layer comprising an erosion-resistant material, on the primary laminated structure. In addition, such a laminated structure is disclosed.

9 Claims, 1 Drawing Sheet

LAMINATED STRUCTURE AND METHOD FOR PRODUCING A LAMINATED STRUCTURE

REFERENCE TO RELATED APPLICATIONS

This application claims the benefit of the filing date of German Patent Application No. 10 2006 023 210.0 filed May 17, 2006 and of U.S. Provisional Patent Application No. 60/747,456 filed May 17, 2006, the disclosures of which are hereby incorporated herein by reference.

FIELD OF THE INVENTION

The field relates to a method for producing a laminated structure, a laminated structure, and an aircraft comprising a laminated structure, in particular, a method for producing an erosion-resistant laminated structure.

BACKGROUND OF THE INVENTION

In technical applications, laminated structures such as structures that comprise a layered construction made of thin individual layers of the same type or of different types are used in a number of areas. For example, such laminated structures are used in aircraft engineering for constructing fuselage structures. In particular, in aircraft engineering, such fuselage structures may be subject to very considerable loads. Mechanical loads in the nose region, in the region of the leading edge of the wing, of the cockpit, and of the horizontal tail unit and/or the vertical tail unit of the aircraft are examples of such loads. Such fuselage structures are also erosion-prone and thus prone to wear. From prior art, various options are known to protect the fuselage against such loads. There needs to be an improved way of reducing such erosion in fuselage structures as well as protecting the structures against such considerable loads.

SUMMARY OF THE INVENTION

According to an embodiment, a method for producing a laminated structure comprises forming a primary laminated structure from a plurality of layers, and forming an additional layer of an erosion-resistant material, on the primary laminated structure. A laminated structure which may be produced in a simple manner and may provide effective protection against mechanical loads, is thus provided.

According to an embodiment a laminated structure comprises a first layer that comprises a first material, a second layer that comprises a second material, and a cover layer that is made from an erosion-resistant material.

According to an embodiment, a laminated structure may be used in an aircraft.

According to an embodiment of an aircraft, this aircraft comprises a laminated structure.

In the context of this specification, the term "erosion-resistant material" refers to a material whose hardness is greater than that of aluminum. In this context, the term "erosion" refers in particular to wear and tear as a result of normal environmental factors and/or as a result of collisions of the outer layer of the laminated structure with objects that wear or deform the outer layer. In particular, the term "erosion-resistant materials" refers to materials whose hardness is greater than that of aluminum, i.e., materials with a Brinell hardness exceeding approximately 80 HB. In particular, this refers to materials with a Brinell hardness of between 100 HB and 220 HB, preferably a Brinell hardness of between 130 HB and 190 HB, for example, a Brinell hardness of 190 HB.

One advantage is that a laminated structure may be formed which apart from a primary laminated structure, such as a laminated structure made of a conventionally known laminated structure comprising various layers may include an additional layer made from an erosion-resistant material. This additional layer made of an erosion-resistant material may form the outer layer of the laminated structure and may provide good resistance to erosion. For example, this additional layer of erosion-resistant material is integrally formed as a layer of the laminated structure and should not to be confused with non-integrally formed alternatives, such as a varnish, a steel sheet or a protective cover that are subsequently applied to the laminated structure. In one example, a laminated structure is integrally formed and has a metal sheet as an outer layer that may be bent and deformed after manufacture of the laminate. This provides many advantages including improved manufacturability, reduced cost and improved durability. The integrally formed metal sheet may be a permanent component of the laminate, preventing chipping, for example.

Such a laminated structure in one example may be an efficient design of a laminated structure. By using such a laminated structure, any erosion-prone regions of a system, for example, including regions of a fuselage, an aircraft's tail unit, an aircraft's cockpit region, or parts of the bodywork in automotive engineering, may be formed. As a result of using the laminated structure, underlying regions or the primary laminated structure itself may be protected against erosion and/or damage. At the same time, by means of such a laminated structure, a decoratively satisfactory appearance of such erosion-prone regions of the system may be ensured.

When comparing the laminated structure with lining the underside of a covering varnish with an elastic backing, which lining serves to cushion forces against small parts, thus preventing and/or delaying tearing, and/or chipping, of the covering varnish, the process of producing the laminated structure avoids some work phases in production, where the work phases are required to apply this covering varnish. Furthermore, this covering varnish, which provides erosion protection, is not permanent and is not durable because this covering varnish chips off. Similarly, when comparing the laminated structure with the application of an additional steel sheet, the use of a laminated structure with an integrated outer layer made of erosion-resistant material may provide an advantage in that the production of an erosion protected material no longer requires an additional work step, i.e. an extra step of applying an erosion-resistant material, because an erosion protective material has been integrated in the laminated structure at the time this laminated structure was produced.

Below, embodiments of the method for producing a laminated structure are described. However, the embodiments described also apply to the laminated structure, to the use of a laminated structure in an aircraft, and to the aircraft comprising a laminated structure.

According to a further embodiment of the method, the erosion-resistant material is a material selected from the group consisting of steel, stainless steel and titanium. Such materials are examples of materials whose hardness is greater than the hardness of aluminum, and are materials used often in aircraft engineering. As a result of this greater hardness, during normal operation, layers made from such a material may experience less wear as a result of erosion than those layers made of aluminum, in particular when such layers form the outer layer of the aircraft and are in direct contact with the environment on the outside of the aircraft.

According to a further embodiment of the method, the layers of the plurality of layers comprise at least a first material and a second material. Preferably the first material is aluminum. The second material is preferably a glass-fiber reinforced plastic (GFP), a carbon-fiber reinforced plastic (CFP), an aramid fiber material and/or a cotton fiber material. In this arrangement, when the laminated structure is being formed, the layers may be applied in an alternating sequence of layers of the first material and layers of the second material. According to one example, an outer layer of the laminated structure is formed by the layer comprising an erosion-resistant material, whereas the second outer layer, which faces the first outer layer, is preferably made of aluminum. Preferably, the layer onto which the erosion-resistant layer is placed is a layer of the second material, for example, a CFP or a GFP material.

Such a laminated structure, which as a primary laminated structure comprises an alternating sequence of layers made from the above-mentioned materials, may provide excellent stability under load while being lighter in weight. The outermost layer, according to one example may be made of an erosion-resistant material, and may be particularly suitable to combine the advantageous characteristics of the primary laminated structure with improved erosion-resistance, such that there may be no need for any additional subsequent formation of erosion protection layer, such as using a covering varnish or subsequent applying a steel sheet.

According to a further embodiment of the method, the additional layer made of an erosion-resistant material is bonded to the primary laminated structure. Such bonding, for example, may take place by means of a resin or some other known adhesive material, and may be a particularly efficient way of forming the additional layer of erosion-resistant material on the primary laminated structure. In particular, the laminated structure may be formed in a single curing step, wherein the layer made of erosion-resistant material is connected to the primary laminated structure by means of a resin or adhesive material, with the resin or adhesive material also being used to form the second material, for example, a GFP or CFP material.

Below, embodiments of the laminated structure are described. The embodiments described also apply to the method for producing a laminated structure, to the use of a laminated structure in an aircraft, and to the aircraft comprising a laminated structure. According to a further embodiment, the laminated structure comprises a plurality of layers of the first material and of the second material, which have been arranged in an alternating sequence. Preferably, the individual layers comprise a thickness of between 0.1 mm and 0.5 mm, preferably a thickness of between 0.2 mm and 0.3 mm.

According to a further embodiment, an erosion-prone component is formed by means of the laminated structure. Such erosion-prone components include components in the skin of an aircraft, where the components are subjected to considerable loads. For example, in particular, nose regions such as the region of the cockpit, the region of the leading edge of the wings, and the regions of the vertical tail unit or the horizontal tail unit are subjected to very considerable mechanical loads. In these regions of the fuselage or of the skin of the aircraft, a laminated structure may be used.

In one example, the nose components and/or erosion-prone components of a fuselage, where the components are made from aluminum- and glass fiber reinforced glare layers, such that the outermost layer is a layer made of stainless steel, may be laminated by using the laminating process disclosed.

It should be pointed out that characteristics or steps which have been described with reference to one of the above embodiments or with reference to one of the above aspects may also be used in combination with other characteristics or steps of other embodiments or aspects described above.

Below, the laminated structure is described in more detail by means of embodiments with reference to the FIGURE.

DETAILED DESCRIPTION

Figure 1:
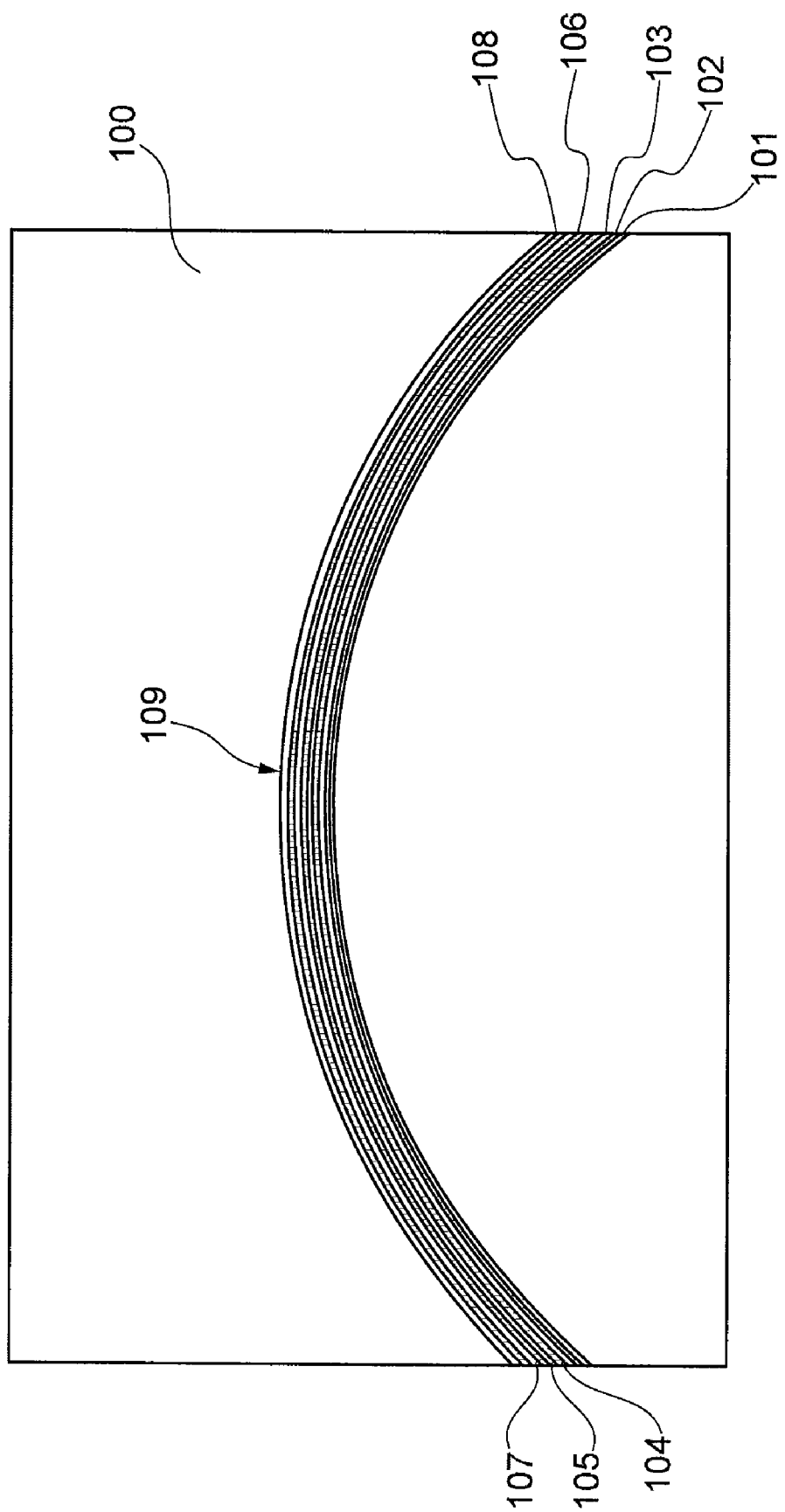
FIG. 1 shows a diagrammatic view of a laminated structure according to one embodiment.

The examples described and drawings rendered are illustrative and are not to be read as limiting the scope of the invention as it is defined by the appended claims.

FIG. 1 diagrammatically shows a laminated structure or a metal sheet 100 that comprises a plurality of individual layers. The laminated structure comprises a first aluminum layer 101, a first layer made of a glass-fiber reinforced plastic (GFP) 102, a second aluminum layer 103, a second GFP layer 104, a third aluminum layer 105, a third GFP layer 106, a fourth aluminum layer 107 and a fourth GFP layer 108. These layers constitute a primary laminated structure and may be formed and firmly interconnected by means of methods which are well known to a person of ordinary skill in the art. For example, known bonding methods may be suitable for this interconnection.

On this primary laminated structure, a layer made of stainless steel 109 is formed, where the layer serves as an outer layer of the laminated structure according to the embodiment shown. In FIG. 1, the laminated structure 100 is shown in a curved state in order to indicate that this laminated structure may be bent to a desired form even after having been produced. Such a laminated structure may be particularly suitable for use to form an erosion-prone components in an aircraft fuselage. This additional layer made of stainless steel 109 is formed at the same time as the primary laminated structure, for example, the two are cured together so that when the layer that is arranged underneath the stainless steel layer is a GFP layer, i.e., a fourth GFP layer 108, depicted in the FIGURE, the adhesive or resin used in the formation of this GFP layer may be used to connect the stainless steel layer to the primary laminated structure.

In addition, it should be pointed out that "comprising" does not exclude other elements or steps, and "a" or "one" does not exclude a plural number. Furthermore, it should be pointed out that characteristics or steps which have been described with reference to one of the above embodiments may also be used in combination with other characteristics or steps of other embodiments described above. Reference characters in the claims are not to be interpreted as limitations.

Alternative combinations and variations of the examples provided will become apparent based on the disclosure. It is not possible to provide specific examples for all of the many possible combinations and variations of the embodiments described but such combinations and variations may be claims that eventually issue.

What is claimed is:

1. A method for producing a laminated structure, comprising the steps of:
    forming a primary laminated structure from a plurality of layers and
    the plurality of layers comprise at least a first layer comprising a first material and a second layer comprising a second material, and the first material is an aluminum, and the second material is a material selected from the group consisting of a glass-fiber reinforced plastic, a carbon fiber reinforced plastic, aramid fibers, and cotton fibers; and laminating and bonding with resin or adhesive material an erosion-resistant sheet of steel or stainless steel on the primary laminated structure.

2. The method of claim 1,
wherein the forming of the primary laminated structure includes forming of an alternating sequence of layers of the first material and of the second material.

3. The method of claim 1, further comprising the step of curing the laminated structure, wherein the primary laminated structure and the erosion-resistant layer are cured at the same time.

4. A laminated structure comprising:
a first layer of an aluminum;
a second layer of a material selected from the group of materials consisting of a glass fiber reinforced plastic, a carbon fiber reinforced plastic, aramid fibers, and cotton fibers; and
a cover sheet made of steel or stainless steel as an erosion-resistant material, the cover sheet being laminated and bonded to the first layer or the second layer by a resin or an adhesive material.

5. The laminated structure of claim 4, further comprising additional layers of a first material of an aluminum and of a second material of the same material selected for the second layer, wherein the additional layers are arranged in a plurality of laminated layers having an alternating sequence of the first material and the second material.

6. The laminated structure of claim 5,
wherein each of the plurality of laminated layers has a thickness of between 0.1 mm and 0.5 mm.

7. A method for using the laminated structure of claim 4 comprising: providing the laminated structure of claim 7; and utilizing the laminated structure in a fuselage, an air foil, a vertical tail unit, a horizontal tail unit or a combination thereof.

8. An aircraft comprising the laminated structure of claim 4.

9. An erosion-resistant component for an aircraft, comprising the laminated structure of claim 4, wherein the laminated structure is formed and cured in the shape of the erosion-resistant component and the cover sheet protects the erosion-resistant component from erosion.

* * * * *